US011611899B2

(12) United States Patent
Liang et al.

(10) Patent No.: US 11,611,899 B2
(45) Date of Patent: Mar. 21, 2023

(54) METHOD OF QUALITY OF SERVICE CONTROL FOR A SPECIFIC USER EQUIPMENT IN A SLICE

(71) Applicant: ZTE CORPORATION, Guangdong (CN)

(72) Inventors: Shuang Liang, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/865,039

(22) Filed: Jul. 14, 2022

(65) Prior Publication Data

US 2022/0353729 A1    Nov. 3, 2022

Related U.S. Application Data

(63) Continuation of application No. PCT/CN2020/072689, filed on Jan. 17, 2020.

(51) Int. Cl.
*H04W 28/02* (2009.01)
*H04W 28/08* (2023.01)

(52) U.S. Cl.
CPC .......... *H04W 28/0268* (2013.01); *H04W 28/0992* (2020.05)

(58) Field of Classification Search
CPC .......... H04W 28/02; H04W 28/0268; H04W 28/0992
See application file for complete search history.

(56) References Cited

U.S. PATENT DOCUMENTS

| | | | |
|---|---|---|---|
| 2019/0223250 A1 | 7/2019 | Dao et al. | |
| 2019/0253917 A1* | 8/2019 | Dao | H04M 15/66 |
| 2020/0187043 A1* | 6/2020 | Xin | H04W 48/16 |
| 2020/0383005 A1* | 12/2020 | Wu | H04W 28/24 |
| 2021/0076252 A1* | 3/2021 | Wei | H04L 12/1403 |
| 2021/0314820 A1* | 10/2021 | Schliwa-Bertling | H04L 47/762 |
| 2021/0352521 A1* | 11/2021 | Pan | H04L 47/24 |
| 2022/0022089 A1* | 1/2022 | Zhu | H04W 28/0268 |

(Continued)

FOREIGN PATENT DOCUMENTS

| | | | | |
|---|---|---|---|---|
| CN | 110519805 A | 11/2019 | | |
| EP | 3905766 A1 * | 11/2021 | ............ | H04L 47/14 |
| EP | 4068839 A1 * | 10/2022 | ............ | H04W 24/04 |

OTHER PUBLICATIONS

Huawei et al.: "TS23.501: Clarification for the default QoS flow, notification control and 5QI" 3GPP, S2-I 75610, Aug. 21-25, 2017, Sophia Antipolis, France (13 Pages).

(Continued)

*Primary Examiner* — Mehmood B. Khan
(74) *Attorney, Agent, or Firm* — Foley & Lardner LLP

(57) ABSTRACT

A system and method of providing quality of service (QoS) control for a specific user equipment (UE) in a slice. The system and method include receiving, by a Session Management Function (SMF) from an Access and Mobility Management Function (AMF), a request for a quality of service (QoS) flow for a wireless communication device; determining, by the SMF responsive to receiving the request, a flow bit rate for the QoS flow; and transmitting, by the SMF to a repository through a Unified Data Management (UDM), a message causing the UDM to update a total flow bit rate in use according to the flow bit rate.

20 Claims, 9 Drawing Sheets

(56) References Cited

U.S. PATENT DOCUMENTS

| | | | |
|---|---|---|---|
| 2022/0086698 A1* | 3/2022 | Yao | H04L 43/20 |
| 2022/0116753 A1* | 4/2022 | Gan | H04M 15/8038 |
| 2022/0159605 A1* | 5/2022 | Li | H04W 60/00 |
| 2022/0183049 A1* | 6/2022 | Lee | H04W 72/569 |
| 2022/0183053 A1* | 6/2022 | Li | H04W 74/0808 |
| 2022/0190886 A1* | 6/2022 | Islam | H04W 72/044 |
| 2022/0217763 A1* | 7/2022 | Oviedo | H04W 16/14 |
| 2022/0312481 A1* | 9/2022 | Talarico | H04L 1/1812 |
| 2022/0369155 A1* | 11/2022 | Hedman | H04W 28/18 |

OTHER PUBLICATIONS

International Search Report and Written Opinion for PCT Appl. No. PCT/CN2020/072689 dated Aug. 7, 2020 (8 pages).

* cited by examiner

700 

```
receiving, by a Session Management
Function (SMF) from an Access and Mobility
Management Function (AMF), a request for a
quality of service (QoS) flow for a wireless
communication device
702
```

↓

```
determining, by the SMF responsive to
receiving the request, a flow bit rate for the
QoS flow
704
```

↓

```
transmitting, by the SMF to a repository
through a Unified Data Management (UDM),
a message causing the UDM to update a total
flow bit rate in use according to the flow bit
rate
706
```

receiving, by a Session Management Function (SMF) from an Access and Mobility Management Function (AMF), a request for a quality of service (QoS) flow for a wireless communication device
802 determining, by the SMF responsive to receiving the request, a flow bit rate for the QoS flow
804 transmitting, by the SMF to a Policy Control Function (PCF), an indication of the flow bit rate for the QoS flow
806

receiving, by an Access and Mobility Management Function (AMF) from a repository through a Unified Data Management (UDM), an authorized flow bit rate per slice
902 sending, by the AMF responsive to a wireless communication device entering a connected mode, the authorized flow bit rate per slice to a Radio Access Network (RAN), to cause the RAN to determine whether to allow the wireless communication device to apply a flow bit rate for a quality of service (QoS) flow
904

FIG. 9

METHOD OF QUALITY OF SERVICE CONTROL FOR A SPECIFIC USER EQUIPMENT IN A SLICE

CROSS-REFERENCE TO RELATED APPLICATION

This application claims the benefit of priority under 35 U.S.C. § 120 as a continuation of PCT Patent Application No. PCT/CN2020/072689, filed on Jan. 17, 2020, the disclosure of which is incorporated herein by reference in its entirety.

TECHNICAL FIELD

The disclosure relates generally to wireless communications and, more particularly, to systems and methods for quality of service (QoS) control for a specific user equipment (UE) in a slice.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, by a Session Management Function (SMF) from an Access and Mobility Management Function (AMF), a request for a quality of service (QoS) flow for a wireless communication device. In some embodiments, the method includes determining, by the SMF responsive to receiving the request, a flow bit rate for the QoS flow. In some embodiments, the method includes transmitting, by the SMF to a repository through a Unified Data Management (UDM), a message causing the UDM to update a total flow bit rate in use according to the flow bit rate.

In another embodiment, a method includes transmitting, by an Access and Mobility Management Function (AMF) to a Session Management Function (SMF), a request for a quality of service (QoS) flow for a wireless communication device. In some embodiments, the request causes the SMF to determine a flow bit rate for the QoS flow according, and transmit, to a repository through a Unified Data Management (UDM), a message causing the UDM to update a total flow bit rate in use according to the flow bit rate.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 is a flow diagram depicting a method for provide quality of service (QoS) control for a specific user equipment (UE) in a slice, in accordance with some embodiments of the present disclosure.

FIG. 8 is a flow diagram depicting a method for provide quality of service (QoS) control for a specific user equipment (UE) in a slice, in accordance with some embodiments of the present disclosure.

FIG. 9 is a flow diagram depicting a method for provide quality of service (QoS) control for a specific user equipment (UE) in a slice, in accordance with some embodiments of the present disclosure.

DETAILED DESCRIPTION OF EXEMPLARY EMBODIMENTS

Figure 1:
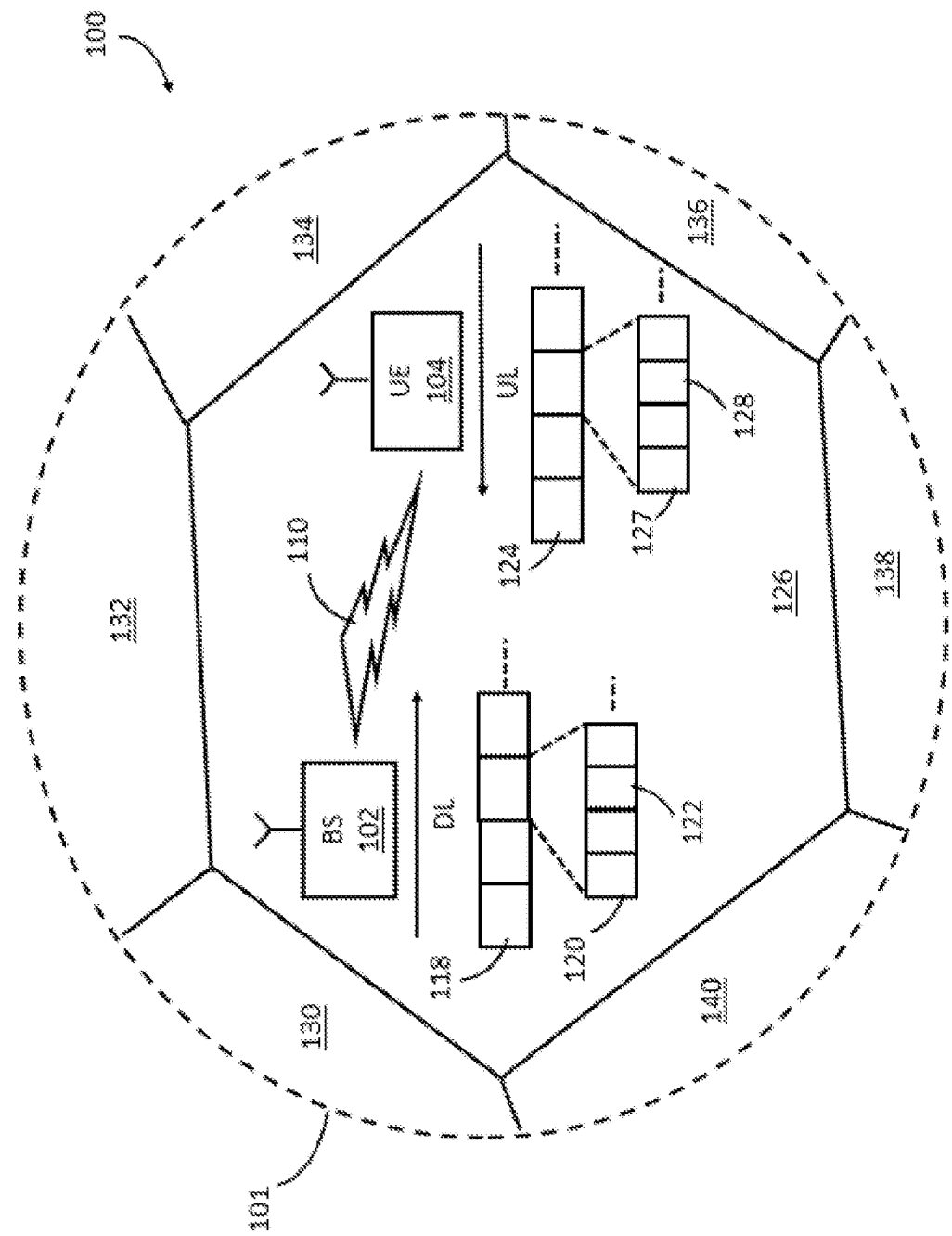
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
5G-GUTI 5G-Globally Unique Temporary UE Identify
AF Application Function
AMF Access and Mobility Management Function
AN Access Network
ARP Allocation and Retention Priority
CM Connected Mode
DL Down Link or Downlink
DN Data Network
DNN Data Network Name
ETSI European Telecommunications Standards Institute
GBR Guaranteed Bit Rate
GFBR Guaranteed Flow Bit Rate
MBR Maximum Bit Rate
MFBR Maximum Flow Bit Rate
NAS Non-Access Stratum
NF Network Function
NG-RAN Next Generation Node Radio Access Node
NR Next Generation RAN
OFDM Orthogonal Frequency-Division Multiplexing
OFDMA Orthogonal Frequency-Division Multiple Access
PCF Policy Control Function
PDU Packet Data Unit.
QoS Quality of Service
RAN Radio Access Network
RAN CP Radio Access Network Control Plane
RAT Radio Access Technology
RRC Radio Resource Control
SM NAS Session Management Non Access Stratum
SMF Session Management Function
UDM Unified Data Management
UDR Unified Data Repository
UE User Equipment
UL Up Link or Uplink
UPF User Plane Function The 5G NR QoS (Quality of Service) model is based on QoS flows. The 5G QoS model supports both QoS flows that require guaranteed flow bit rate (GBR QoS flows) and QoS flows that do not require guaranteed flow bit rate (Non-GBR QoS flows). For each GBR QoS flow, the QoS profile includes a Guaranteed Flow Bit Rate (GFBR)—UL and DL, a Maximum Flow Bit Rate (MFBR)—UL and DL, and an Allocation and Retention Priority (ARP). When a GBR QoS flow is accepted by the network, it means the network should reserve enough resource (e.g., GFBR) for the UE (sometimes referred to as wireless communication device). The reserved resource for the UE cannot be shared by other UEs.

Network slicing is introduced in 5G NR. Network slicing allows multiple virtual networks to be created on top of a common shared physical infrastructure. The virtual networks (e.g., network slices) are then customized to meet the specific needs of applications, services, devices, customers or operators.

Each network slice may differ for supported features and network functions optimization. The operator can deploy multiple network slices delivering exactly the same features but for different groups of UEs. When the UE accesses to the network, it can access multiple slices simultaneously. Also in order to reduce investment costs, operators may deploy a network shared by multiple slices. Operators can design a mechanism to allocate (e.g., assign, reserve, distribute) resource for different slices.

When the UE accesses a network slice, it can establish one or more PDU sessions to access different DNs. In each PDU session, there may be some GBR QoS flows (requiring a guaranteed flow bit rate) and non-GBR QoS flows (not requiring a guaranteed flow bit rate). When multiple GBR QoS flows are established, the non-shared and guaranteed resource has to be allocated for such QoS flows.

A guaranteed resource for a UE should be limited. That is, when a UE requests a new GBR QoS flow and the guaranteed resource is depleted/exhausted, then the request should be rejected or should pre-empt the resource of the existing GBR QoS flow. Thus the total GFBR of all the GBR QoS flow for a UE should be controlled by a proper mechanism.

In conventional 5G systems, however, the GFBR of a single GBR flow is controlled by the RAN and UPF, and the control policy is sent from the SMF based on the PCC rule. As a result, there is no mechanism for performing a total GFBR control of all the GBR QoS flows for a UE.

Accordingly, the system and method discussed herein provide quality of service (QoS) control for a specific user equipment (UE) in a slice.

In general, as discussed in greater detail below with respect to FIG. 4, a UDR (sometimes referred to as a repository) stores (via the UDM) the latest total GFBR/MFBR in use. When a new GBR flow is requested and/or authorized, the SMF updates the storage information in the UDR via UDM. That is, when the UE requests to add a new GBR flow, the SMF can decide the GFBR/MFBR based on the policy authorization. The SMF can retrieve or access the total authorized GFBR/MFBR and the total GFBR/MFBR in use from the UDM. Based on the retrieved data, the SMF can decide or determine whether to allow or add such a GBR QoS flow.

When the GBR QoS flow succeeds to be added, modified or removed, the SMF sends (e.g., transmits, delivers) the GFBR/MFBR to the UDM, causing the UDM to send the GFBR/MFBR to the UDR to update the total GFBR/MFBR in use, in one or more embodiments.

As discussed in greater detail below with respect to FIG. 5, the UDR may store (via the PCF) the latest total GFBR/MFBR in use. The PCC rule from the PCF authorizes QoS to be enforced for each specific service data flow. The SMF determines the authorized QoS of a QoS Flow using the PCC rules associated to the QoS Flow. The SMF notifies the PCF if the GFBR of a QoS Flow can no longer be guaranteed. When a new GBR flow is quested, the SMF notifies the PCF the MBR of a service data flow is allocated. The PCC stores such information in the UDR.

That is, when the UE requests to add a new GBR flow, the SMF decides or determines the GFBR/MFBR based on the policy authorization, in some embodiments. The SMF can retrieve, receive or access the total MBR in use (e.g., per slice) and the total authorized MBR (e.g., per slice) for the UE from the PCF. The PCF may retrieve, receive or access such information from the UDR, and can send such information to the SMF.

When the GBR QoS flow succeeds to be added, modified or removed, the SMF can notify or communicate to the PCF the service data flow with the authorized MBR. The PCF can update the total MBR in use in the UDR.

As discussed in greater detail below with respect to FIG. 6, the UDR stores the latest the total GFBR/MFBR in use, in at least some embodiments. When the UE enters a connected mode (e.g., when the UE has and/or maintains an RRC connection with a wireless communication node), the AMF can get or receive such information as subscription information from the UDM. The AMF can send, transmit or communicate the authorized GFBR/MFBR to the NG-RAN, causing the NG-RAN to calculate (e.g., derive, determine) the total GFBR/MFBR in use per slice. If the a new GBR QoS flow is added or an existing GBR QoS flow is modified, the NG-RAN can decide or determine whether such operation is allowed based on the authorized GFBR/MFBR (e.g., per slice).

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
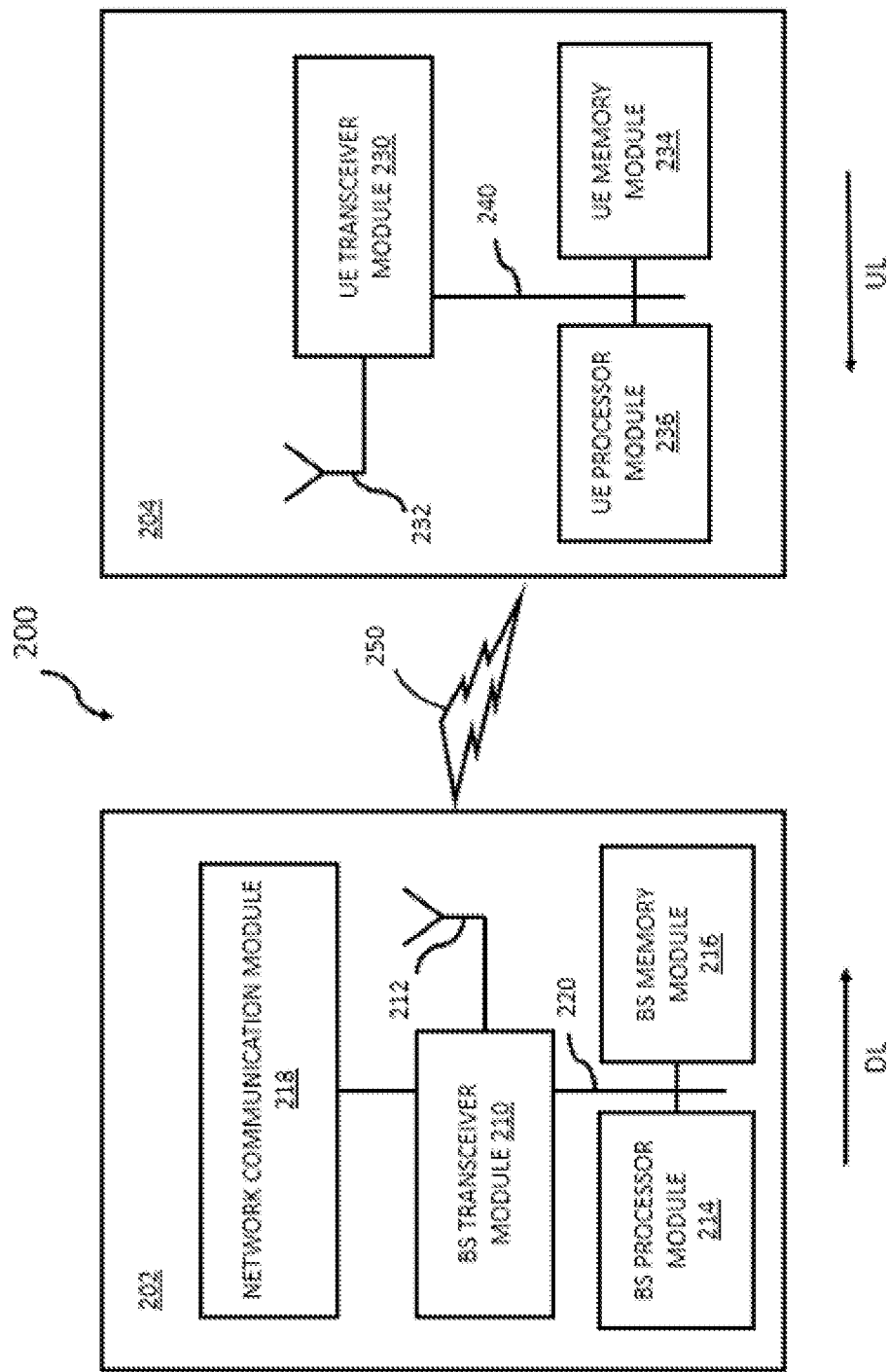
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. 5G System Architecture

Figure 3:
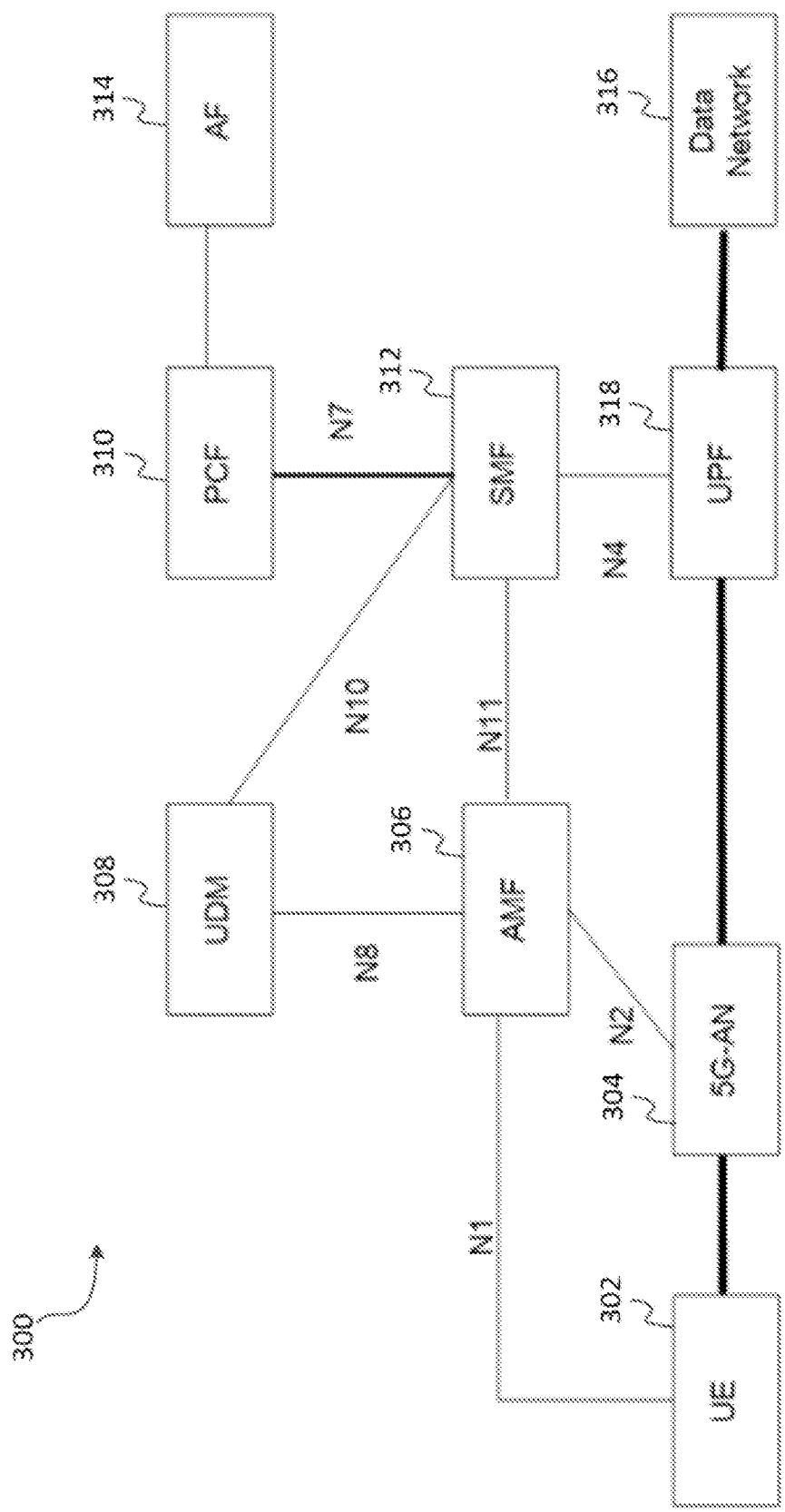
FIG. 3 illustrates a block diagram of an example architecture of a 5G system, in accordance with some embodiments of the present disclosure.

FIG. 3 illustrates a block diagram of an example architecture of a 5G system, in accordance with some embodiments of the present disclosure. The 5G system 300 includes various components, such as a UE 302 (e.g., UE 104 in FIG. 1), a 5G-AN 304, an AMF 306, a UDM 308, a PCF 310, an SMF 312, an AF 314, a UPF 318, and/or a data network 316. The AMF 306 includes one or more functionalities, such as UE mobility management, reachability management, connection management. Although shown with only one component of each type, the environment 300 may include any number of components (e.g., a plurality of UEs 302, a plurality of 5G-ANs 304, a plurality of AMFs 306, etc.) interconnected in any arrangement to facilitate the operations of the 5G system, as described herein.

The AMF 306 terminates the RAN CP interface (depicted in FIG. 3 as, N2) and NAS interface (depicted in FIG. 3 as, N1), for NAS ciphering and integrity protection. The AMF 306 distributes the SM NAS to the proper SMFs 312 via the N11 interface. The SMF 312 includes the following features or functions: UE IP address allocation & management, selection and control of UPF 318, and PDU connection management.

The UPF 318 is the anchor point for Intra-/Inter-RAT mobility and the external PDU session point of interconnect to data network 316. The UPF 318 also routes and forwards a data packet according to an indication from the SMF 312. The UPF 318 can also buffer the DL data when the UE 302 is in idle mode. The UDM 308 manages and/or stores the subscription profile for the UEs 302.

The subscription includes the data used for mobility management (e.g., restricted area), session management (e.g., QoS profile per slice per DNN). The subscription data also includes the slice selection parameters which are used by AMF 306 to select a proper SMF 312. The AMF 306 and SMF 312 can get the subscription from the UDM 308. The subscription data is stored in a UDR (Unified Data Repository). The UDM 308 uses such data upon reception of a request from AMF 306 or SMF 312.

The PCF 310 generates at least one policy to govern network behavior based on the subscription and indication from AF 314. The PCF 310 also provides policy rules to control plane functions (e.g., AMF 306 and SMF 312) to enforce them.

The PCF 310 accesses the UDR to retrieve (e.g., get, fetch, receive, acquire) the policy data. The NEF (Network Exposure Function) is deployed optionally for exchanging information between 5GC and the external third party. In this case, the AF 314 (Application Function) may store the application information in the UDR via NEF. Each of the elements/functions/entities referenced herein may include hardware (e.g., at least one processor or circuitry) or a combination of hardware and software (e.g., software executing on the hardware).

3. Storing Authorized GFBR in UDR Via UDM for Quality of Service (QoS) Control

Figure 4:
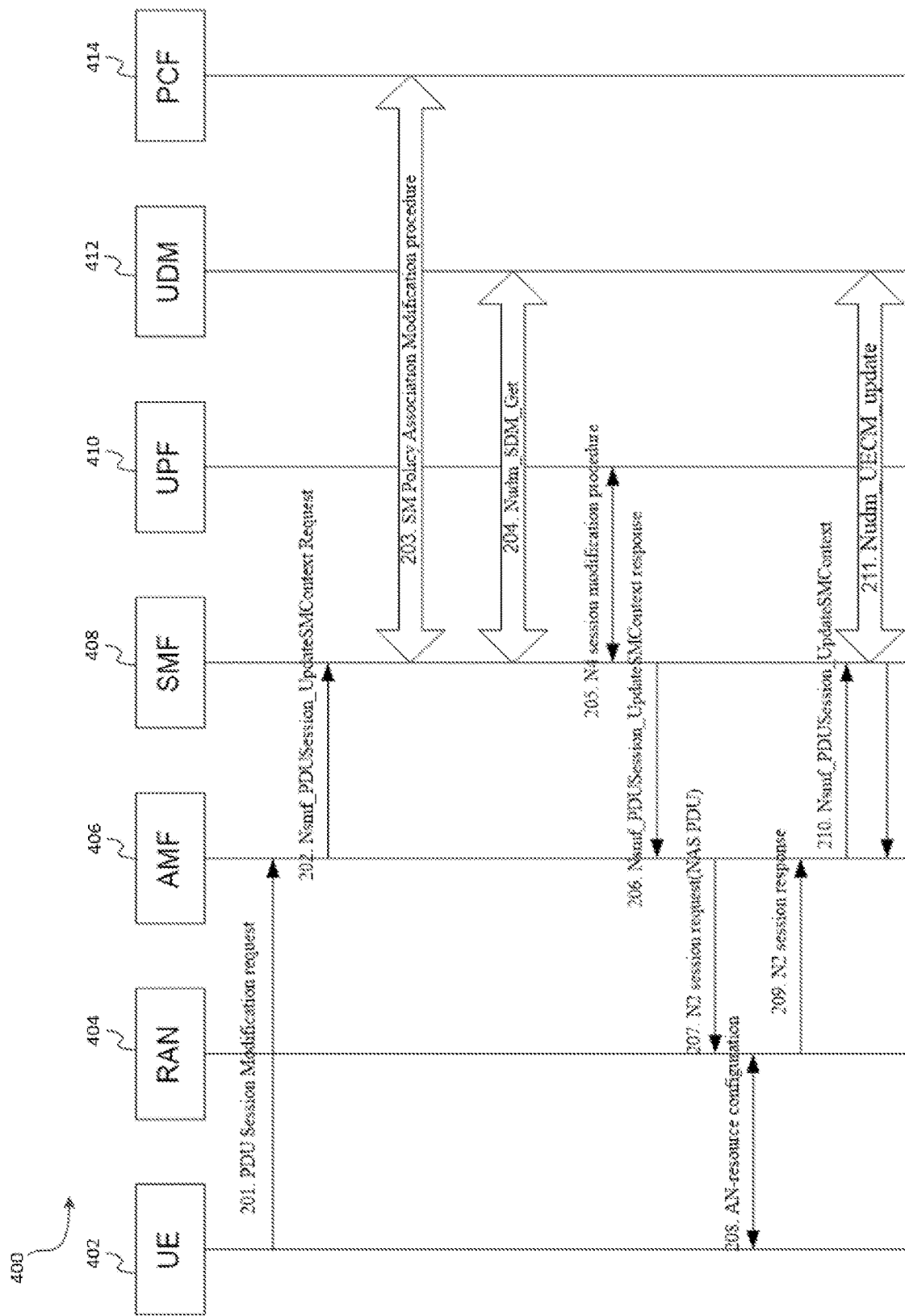
FIG. 4 illustrates a flow diagram of an example environment of a 5G system that stores authorized GFBR in UDR via a UDM, in accordance with some embodiments of the present disclosure.

FIG. 4 illustrates a flow diagram of an example environment of a 5G system that stores authorized GFBR (e.g., per slice) in UDR via a UDM, in accordance with some embodiments of the present disclosure. The example environment 400 includes a UE 402 (such as UE 104 in FIG. 1), a RAN 404 (also referred to herein as NG-RAN 404), an AMF 406, an SMF 408, a UPF 410, a UDM 412, and/or a PCF 414.

At operation 201 (labeled in FIG. 4 as, "201. PDU Session Modification request"), and in some embodiments, the UE 402 can initiate a PDU Session Modification procedure by the transmission of an NAS message via NG-RAN 404 to the AMF 406. In such a message, the UE 402 may request to add a new GBR flow, modify the GFBR/MFBR of an existing QoS Flow or delete a GBR flow. In some embodiments, the requested QoS is included in the message.

Depending on access type, if the UE 402 was in a particular state (e.g., a CM-IDLE state), then the SM-NAS message may be preceded by a Service Request procedure. An Access Type in 5GS may be a 3GPP access type or a Non 3GPP access type. In some embodiments, if the UE 402 is in a CM-idle state and the UE 402 accesses via a 3GPP access type, then the UE 402 may initiate service request before the PDU modification procedure. In some embodiments, if the UE 402 is in CM-Idle in Non-3GPP access, the UE 402 may move the PDU session in Non 3GPP access. In some embodiments, the UE 402 may not initiate service request procedure in N3GPP access.

At operation 202 (labeled in FIG. 4 as, "202. Nsmf_PDUSession_UpdateSMContext Request"), and in some embodiments, the AMF 406 invokes (e.g., performs, executes, delivers) Nsmf_PDUSession_UpdateSMContext to the serving SMF 408 for the UE 402.

At operation 203 (labeled in FIG. 4 as, "203.SM Policy Association Modification procedure"), and in some embodiments, the SMF 408 initiates (via the UPF 410, the UDM 412, and/or the PCF 414) an SM Policy Association Modification procedure to authorize the requested QoS. If dynamic PCC is not deployed, the SMF 408 may apply a local policy to decide whether to change the QoS profile (e.g., of a specific existing QoS flow), according to the requested QoS.

At operation 204 (labeled in FIG. 4 as, "204. Nudm_SDM_Get"), and in some embodiments, the SMF 408 retrieves (e.g., fetches, requests. etc.) the Session Management Subscription data including the total authorized GFBR/MFBR (e.g., per slice) and/or the latest the total GFBR/MFBR (e.g., per slice) in use. In some embodiments, if the requested GFBR/MFBR is not greater than the difference between such two parameters, then the SMF may accept (e.g., add a new GBR flow or modify the GFBR/MFBR of an existing QoS Flow) the operation. In some embodiments, if the requested GFBR/MFBR is greater than the difference between such two parameters, the SMF may reject the operation or accept the operation and then modify other GBR flows to make sure the total GFBR/MFBR in use is not greater than the total authorized GFBR/MFBR. In some embodiments, the total authorized GFBR/MFBR (e.g., per slice) may be retrieved during a PDU session establishment procedure.

At operation 205 (labeled in FIG. 4 as, "205. N4 session modification procedure"), and in some embodiments, the SMF 408 may update the N4 session responsive to an updated QoS profile (e.g., for a specific existing QoS flow) or an added QoS flow.

At operation 206 (labeled in FIG. 4 as, "206. Nsmf_PDUSession_UpdateSMContext response"), and in some embodiments, the SMF 408 sends an Nsmf_PDUSession_UpdateSMContext Response to the AMF 406. In some embodiments, an N1 and/or an N2 container may be included in the response message.

At operation 207 (labeled in FIG. 4 as, "207. N2 session request(NAS PDU)"), and in some embodiments, the AMF 406 transfers, directs, sends or conveys the N2 message (e.g., a message including the N2 container or its data) to the NG-RAN. In some embodiments, if the N1 message (e.g., the PDU Session Modification response, or a message including the N1 container or its data), is included, then the NG-RAN 404 may send, transmit or communicate it to the UE 402.

At operation 208 (labeled in FIG. 4 as, "208. AN-resource configuration"), and in some embodiments, the NR-RAN 404 configures (e.g., modifies, updates, initializes) the radio resource based on the QoS profile included in the N2 container and/or message sent by the SMF 408.

At operation 209 (labeled in FIG. 4 as, "209. N2 session response") and operation 210 (labeled in FIG. 2 as, "Nsmf_PDUSession_UpdateSMContext"), and in some embodiments, upon reception of configuration complete (e.g., an indication that the radio resource has been configured), the NG-RAN 404 acknowledges by sending an N2 transfer message to the SMF 408 via the AMF 406.

At operation 211 (labeled in FIG. 4 as, "211. Nudm UECM update"), and in some embodiments, when the SMF 408 confirms that the radio resource is guaranteed for the GBR QoS flow, the SMF 408 updates the latest the total GFBR/MFBR in use (e.g., per slice) to the UDR via the UDM 412. In some embodiments, the SMF 408 may only send the delta GFBR/MFBR (e.g., indicating an amount or extent of increase or decrease) as a result of the added, removed, or modified GBR QoS flow, for use to update the total GFBR/MFBR in use (e.g., per slice). Such optimization can avoid the simultaneous modification by different SMFs.

In some embodiments, if the total authorized GFBR/MFBR is changed, the UDM may inform the SMF of the updated total authorized GFBR/MFBR. In some embodiments, the SMF may decide whether to modify the GFBR/MFBR of the existing GBR flows or delete some GBR flow based on priority or local policy. In some embodiments, the modification or deletion procedure may be the same as the current mechanism.

3.1 From the Perspective of the SMF

In some embodiments, a Session Management Function (SMF) of a wireless communication node (e.g., BS 102 in FIG. 1) or a wireless communication device (e.g., UE 104 in FIG. 1), may receive, from an Access and Mobility Management Function (AMF) of a wireless communication node (e.g., BS 102 in FIG. 1) or a wireless communication device (e.g., UE 104 in FIG. 1), a request for a quality of service (QoS) flow (e.g., a GBR QoS flow) for a wireless communication device. In some embodiments, the SMF, may determine, responsive to receiving the request, a flow bit rate (e.g., GFBR/MFBR) for the QoS flow. In some embodiments, the SMF may transmit, to a repository (e.g., UDR) through a Unified Data Management (UDM), a message causing the UDM to update a total flow bit rate in use (e.g., total GFBR/MFBR in use, per slice) according to the flow bit rate.

In some embodiments, the request for the QoS flow comprises a request to add, modify, or delete the QoS flow. In some embodiments, the SMF may receive, from the AMF and prior to receiving the request, a service request to transition the wireless communication device from an idle mode to a connected mode. In some embodiments, the SMF may determine the flow bit rate by determining the flow bit rate for the QoS flow according to an authorization policy. In some embodiments, the SMF may receive, from the UDM, a total authorized flow bit rate per slice (e.g., authorized or total authorized GFBR/MFBR per slice), and a total flow bit rate in use per slice (e.g., total GFBR/MFBR in use, per slice).

In some embodiments, the SMF may authorize the flow bit rate for the QoS flow according to the total authorized flow bit rate (e.g., authorized or total authorized GFBR/MFBR) per slice, and a total flow bit rate in use per slice. In some embodiments, the SMF may determine that the flow bit rate for the QoS flow is less than the total authorized flow bit rate per slice, and the total flow bit rate in use per slice. In some embodiments, the SMF may determine that the flow bit rate for the QoS flow is less than or equal to a difference between the total authorized flow bit rate per slice, and the total flow bit rate in use per slice. In some embodiments, the SMF receives the total authorized flow bit rate per slice, and the total flow bit rate in use per slice during a Packet Data Unit (PDU) session establishment procedure.

In some embodiments, the QoS flow comprises a guaranteed bit rate (GBR) QoS flow. In some embodiments, the message includes an updated total flow bit rate in use per slice, and/or the flow bit rate for the QoS flow. In some embodiments, the SMF may transmit, to the AMF, a second message comprising an N1 container, the second message causing the AMF to transmit the N1 container to the wireless communication device through the RAN (e.g., NG-RAN).

In some embodiments, the SMF may transmit, to the RAN through the AMF, a second message comprising an N2 container. In some embodiments, the second message causes the RAN to configure a radio resource according to the N2 container.

3.2 From the Perspective of the AMF

In some embodiments, an Access and Mobility Management Function (AMF) of a wireless communication node (e.g., BS 102 in FIG. 1) or a wireless communication device (e.g., UE 104 in FIG. 1) may transmit to a Session Management Function (SMF) of a wireless communication node (e.g., BS 102 in FIG. 1) or a wireless communication device (e.g., UE 104 in FIG. 1), a request for a quality of service (QoS) flow for a wireless communication device. In some embodiments, the request causes the SMF to determine a flow bit rate (e.g., GFBR/MFBR) for the QoS flow. In some embodiments, the request causes the SMF to transmit, to a repository (e.g., UDR) through a Unified Data Management (UDM), a message causing the UDM to update a total flow bit rate (e.g., total GFBR/MFBR) in use according to the flow bit rate.

In some embodiments, the request for the QoS flow comprises a request to add, modify, or delete the QoS flow. In some embodiments, the AMF may transmit, to the SMF and prior to transmitting the request, a service request to transition the wireless communication device from an idle mode to a connected mode. In some embodiments, the QoS flow comprises a guaranteed bit rate (GBR) QoS flow.

In some embodiments, the AMF may receive, from the SMF, a second message comprising an N1 container. In some embodiments, the AMF may transmit the N1 container to the wireless communication device through a radio access network (RAN). In some embodiments, the AMF may receive, from the SMF, a second message comprising an N2 container. In some embodiments, the AMF may transmit, to a radio access network (RAN), a third message causing the RAN to configure a radio resource according to the N2 container.

4. Storing Authorized GFBR in UDR via PCF

Figure 5:
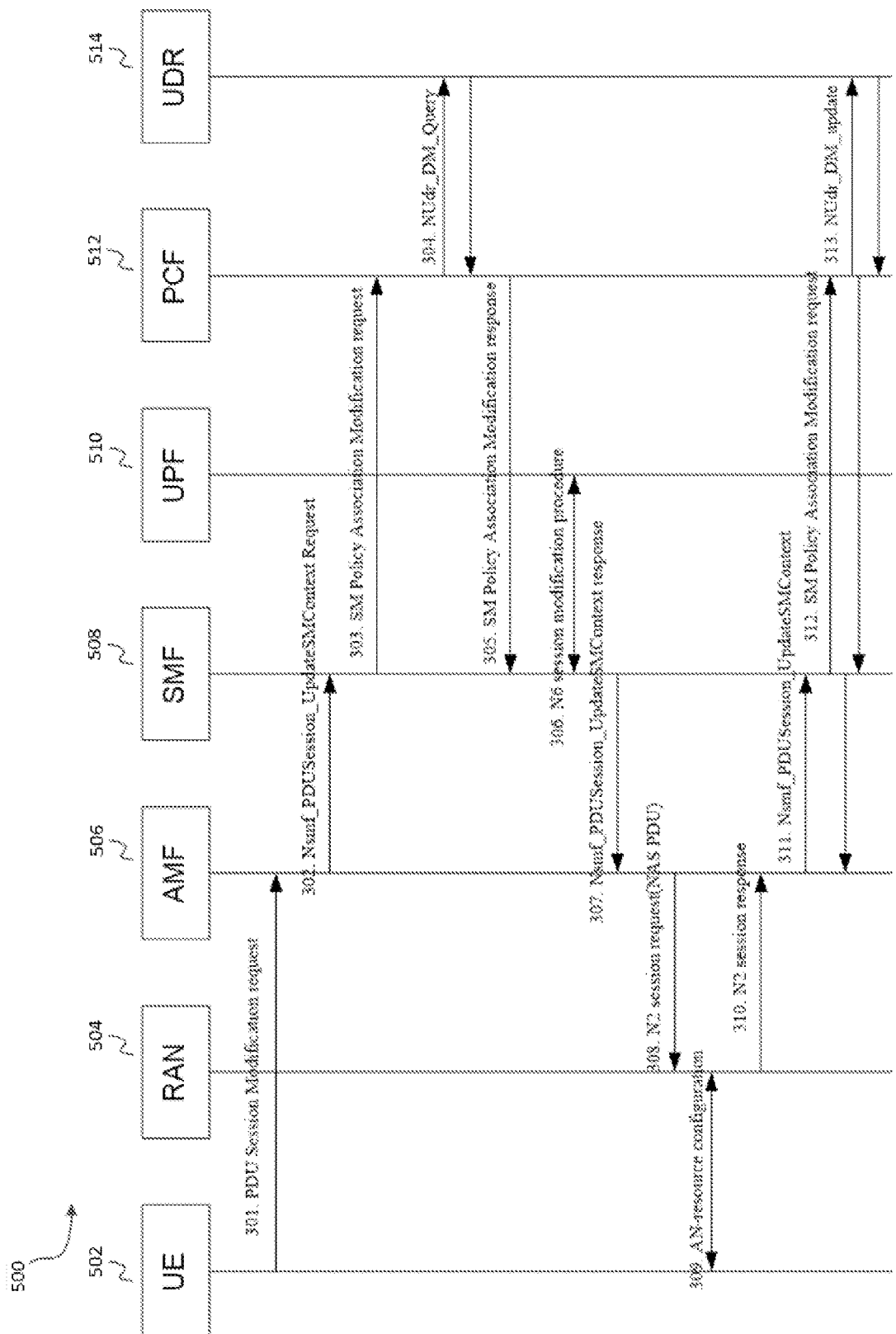
FIG. 5 illustrates a flow diagram of an example environment of a 5G system that stores authorized GFBR in UDR via a PCF, in accordance with some embodiments of the present disclosure.

FIG. 5 illustrates a flow diagram of an example environment of a 5G system that stores authorized GFBR in UDR via a PCF, in accordance with some embodiments of the present disclosure. The example environment 500 includes a UE 502 (such as UE 104 in FIG. 1), a RAN 504 (also referred to herein as NG-RAN 404), an AMF 506, an SMF 508, a UPF 510, a UDM 512, and/or a PCF 514.

At operation 301 (labeled in FIG. 5 as, "301. PDU Session Modification request"), and in some embodiments, the UE 502 initiates a PDU Session Modification procedure by the transmission of an NAS message via NG-RAN 504 to the AMF 506. In such a message, the UE 502 may request to add a new GBR flow, modify the GFBR/MFBR of an existing Qos Flow or delete a GBR flow. In some embodiments, the requested QoS is included in the message.

Depending on the Access Type, if the UE 502 was in a particular state (e.g., CM-IDLE), this SM-NAS message can be preceded by the Service Request procedure.

At operation 302 (labeled in FIG. 5 as, "302. Nsmf_PDUSession_UpdateSMContext Request"), and in some embodiments, the AMF 506 provides or invokes Nsmf_PDUSession_UpdateSMContext to the serving SMF 508 for the UE 502.

At operation 303 (labeled in FIG. 5 as, "303. SM Policy Association Modification request"), and in some embodiments, the SMF 508 initiates a SM Policy Association Modification procedure to authorize the requested QoS for the QoS flow.

At operation 304 (labeled in FIG. 5 as, "304. NUdr_DM_Query") and operation 305 (labeled in FIG. 5 as, "305. SM Policy Association Modification response"), and in some embodiments, the SMF 508 receives, accesses or retrieves the total MBR in use (sometimes referred to as total flow bit rate in use) and/or the total authorized MBR (sometimes referred to as total authorized flow bit rate) for the UE 502 from the PCF 512. The PCF 512 may get such information from the UDR 514 and can send such information to the SMF 508.

At operation 306 (labeled in FIG. 5 as, "306. N6 session modification procedure"), and in some embodiments, the SMF 508 establishes or makes a QoS mapping between the service data flow and the QoS flow. If the QoS profile of the (existing) QoS flow is updated, or if a new QoS flow is added, the SMF 508 may update the N4 session.

At operation 307 (labeled in FIG. 5 as, "307. Nsmf_PDUSession_UpdateSMContext response"), the SMF 508 sends the Nsmf_PDUSession_UpdateSMContext Response to the AMF 506. In some embodiments, an N1 and N2 container may be included in the response message.

At operation 308 (labeled in FIG. 5 as, "308. N2 session request(NAS PDU)"), and in some embodiments, the AMF 506 communicates, transmits, directs, conveys or transfers the N2 message (e.g., a message comprising the N2 container) to the NG-RAN 504. In some embodiments, if the N1 message (e.g., the PDU Session Modification response, or a message comprising the N1 container) is included, then the NG-RAN 504 sends it to the UE 502.

At operation 309 (labeled in FIG. 5 as, "309. AN-resource configuration"), and in some embodiments, the NR-RAN 504 configures the radio resource based on a QoS profile (e.g., requested QoS) included in the N2 container sent by the SMF 508.

At operation 310 (labeled in FIG. 5 as, "310. N2 session response") and operation 311 (labeled in FIG. 5 as "311. Nsmf_PDUSession_UpdateSMContext"), and in some embodiments, upon reception of configuration complete (e.g., an indication that the radio resource is configured), the NG-RAN 504 acknowledges or responds by sending a N2 transfer message to the SMF 508 via the AMF 506.

At operation 312 (labeled in FIG. 5 as, "312. SM Policy Association Modification request"), and in some embodiments, when the SMF 508 confirms or replies that the resource is guaranteed for the GBR QoS flow, the SMF 508 calculates or determines the total MBR in use (e.g., per slice) for service data flows. In some embodiments, the mapping between the service data flow and the QoS flow may be M:N.

At operation 313 (labeled in FIG. 5 as, "313. NUdr_DM_update"), and in some embodiments, the PCF 512 updates (the total GFBR/MFBR in use, in) the storage in the UDR 514 if it receives such information from the SMF 508. In some embodiments, the SMF 508 can only send the delta GFBR/MFBR (e.g., indicating an increase or decrease in amount or extent) responsive to the added, removed or modified the GBR QoS flow, for use in updating the total MBR in use (e.g., per slice). Such optimization can avoid the simultaneous modification by different SMFs and/or PCFs. Such optimization can be performed in PCF 512 or SMF 508.

In some embodiments, if the total authorized MBR is changed, the UDR may inform the PCF of the updated total authorized MBR. In some embodiments, the PCF informs the SMF of it. In some embodiments, the SMF may decide whether to modify the GFBR/MFBR of the existing GBR flows or delete some GBR flow based on priority or local policy. In some embodiments, the modification or deletion procedure is same with the current mechanism.

In some embodiments, a service data flow (SDF) may be an aggregate set of packet flows that matches a service data flow template. In some embodiments, a service data flow filter may be a set of packet flow header parameter values/ranges used to identify one or more of the packet (e.g., IP or Ethernet) flows constituting a service data flow. In some embodiments, a service data flow template may be a set of service data flow filters in a policy rule or an application identifier in a policy rule referring to an application detection filter, required for defining a service data flow. In some embodiments, a service data flow filter identifier may be a scalar that is unique for a specific service data flow filter within an IP connectivity access network (IP-CAN) session.

In some embodiments, a 5G QoS model may be based on QoS Flows. In some embodiments, a 5G QoS model may support QoS Flows that require guaranteed flow bit rate (GBR QoS Flows) and/or QoS Flows that do not require guaranteed flow bit rate (Non-GBR QoS Flows). In some embodiments, a 5G QoS model may support Reflective QoS.

In some embodiments, a QoS Flow may be the finest granularity of QoS differentiation in a PDU Session. A QoS Flow ID (QFI) is used to identify a QoS Flow in the 5G System. In some embodiments, User Plane traffic with the same QFI within a PDU Session may receive the same traffic forwarding treatment (e.g., scheduling, admission threshold). In some embodiments, the QFI may be carried in an encapsulation header on N3 (and N9). For example, without any change to the e2e packet header. In some embodiments, the QFI may be used for all PDU Session Types. In some embodiments, the QFI may be unique within a PDU Session. In some embodiments, the QFI may be dynamically assigned or may be equal to the 5QI.

In some embodiments, a QoS flow may be used to control a packet flow through a 5G system. In some embodiments, a PCF may send a policy rule including parameters about the service data flow, regardless if the PCF knows or does not know about the QoS flow.

4.1 From the Perspective of the SMF

In some embodiments, a Session Management Function (SMF) of a wireless communication node (e.g., BS 102 in FIG. 1) or a wireless communication device (e.g., UE 104 in FIG. 1), may receive, from an Access and Mobility Management Function (AMF), a request for a quality of service (QoS) flow (e.g., a GBR QoS flow) for a wireless communication device. In some embodiments, the SMF may determine, responsive to receiving the request, a flow bit rate (e.g., GFBR/MFBR) for the QoS flow. In some embodiments, the SMF may transmit, to a Policy Control Function (PCF), an indication of the flow bit rate for the QoS flow.

In some embodiments, the request for the QoS flow comprises a request to add, modify or delete the QoS flow. In some embodiments, the SMF receives, from the AMF and prior to receiving the request, a service request to transition the wireless communication device from an idle mode to a connected mode. In some embodiments, the SMF determines the flow bit rate by authorizing the flow bit rate for the QoS flow according to an authorization policy.

In some embodiments, the SMF receives, accesses or retrieves, from the PCF, a total authorized flow bit rate (e.g., total authorized MBR) per slice for the wireless communication device, and/or a total flow bit rate (e.g., total MBR) in use per slice for the wireless communication device. In some embodiments, the SMF authorizes the flow bit rate (e.g., GFBR/MFBR) for the QoS flow according to the total authorized flow bit rate per slice, and the total flow bit rate in use per slice. In some embodiments, the SMF determines that the flow bit rate for the QoS flow is less than a difference between the total authorized flow bit rate per slice, and the total flow bit rate in use per slice. In some embodiments, the SMF receives the total authorized flow bit rate per slice, and the total flow bit rate in use per slice during a Packet Data Unit (PDU) session establishment procedure.

In some embodiments, the QoS flow comprises a guaranteed bit rate (GBR) QoS flow. In some embodiments, the SMF transmits the flow bit rate (e.g., GFBR/MFBR) to the PCF to cause the PCF to update the total flow bit rate (e.g., total MBR) in use maintained at a repository (e.g., UDR). In some embodiments, the SMF transmits, to the AMF, a second message comprising an N1 container. In some embodiments, the second message causes the AMF to transmit the N1 container to the wireless communication device through the RAN (e.g., NG-RAN).

In some embodiments, the SMF transmits, to the RAN through the AMF, a second message comprising an N2 container. In some embodiments, the second message causes the RAN to configure a radio resource according to the N2 container.

4.2 From the Perspective of the AMF

In some embodiments, an AMF of a wireless communication node (e.g., BS 102 in FIG. 1) or a wireless communication device (e.g., UE 104 in FIG. 1) transmits, to a Session Management Function (SMF), a request for a quality of service (QoS) flow for a wireless communication device. In some embodiments, the request causes the SMF to determine a flow bit rate (e.g., GFBR/MFBR) for the QoS flow. In some embodiments, the request causes the SMF to transmit, to a Policy Control Function (PCF), an indication of the flow bit rate for the QoS flow.

In some embodiments, the request for the QoS flow comprises a request to add, modify, or delete the QoS flow. In some embodiments, the AMF transmits, to the SMF and prior to transmitting the request, a service request to transition the wireless communication device from an idle mode to a connected mode. In some embodiments, the QoS flow comprises a guaranteed bit rate (GBR) QoS flow.

In some embodiments, the AMF receives, from the SMF, a second message comprising an N1 container. In some embodiments, the AMF transmits the N1 container to the wireless communication device through a radio access network (RAN). In some embodiments, the AMF receives, from the SMF, a second message comprising an N2 container. In some embodiments, the AMF transmits, to a radio access network (RAN), a third message causing the RAN to configure a radio resource according to the N2 container.

5. Using UDM and AMF to Cause NG-RAN to Decide Whether to Allow an Update to a QoS Flow FIG. 6 illustrates a flow diagram of an example environment of a 5G system that causes NG-RAN to decide whether to allow an update to a QoS flow (e.g., GBR QoS flow), in accordance with some embodiments of the present disclosure. The example environment 600 includes a UE 602 (such as UE 104 in FIG. 1), a RAN 604 (also referred to herein as NG-RAN 604), an AMF 606, an SMF 608, a UPF 610, a UDM 612, and/or a PCF 614. As shown, the environment 600 includes operations 401-408.

Operations 401-408 may occur during the registration or service request procedure (e.g., as the UE enters connected mode.)

During the procedure, if the AMF 606 does not store the subscription data, it sends the Nudm_SDM_Get request to the UDM 612 to get the Access and Mobility Subscription data and SMF Selection Subscription data from the UDM 612. The UDM 612 may retrieve this information from UDR by Nudr_DM_Query. After a successful response is received, the AMF 606 subscribes to be notified using Nudm_SDM_Subscribe when the data requested is modified, the UDM 612 may subscribe to UDR by Nudr_DM_Subscribe, and the UDM 612 may subscribe to UDR by Nudr_DM_Subscribe. The authorized GFBR/MFBR per slice is also included in the response and may be sent to the AMF 606 via UDM 612.

If the authorized GFBR/MFBR per slice changes, the UDR pushes the updated subscription to the UDM 612 and UDM notifies the AMF 606, in some embodiments. When the AMF 606 receives the updated subscription data, it checks the slice information, in some embodiments.

If the procedure triggers the NG-RAN 604 to setup the UE 602 context, the AMF 606 can include the authorized GFBR/MFBR for the slice in use to the NG-RAN 604. If the authorized GFBR/MFBR is updated, the AMF 606 can communicate to or inform the NG-RAN 604 of the latest or updated data.

Figure 6:
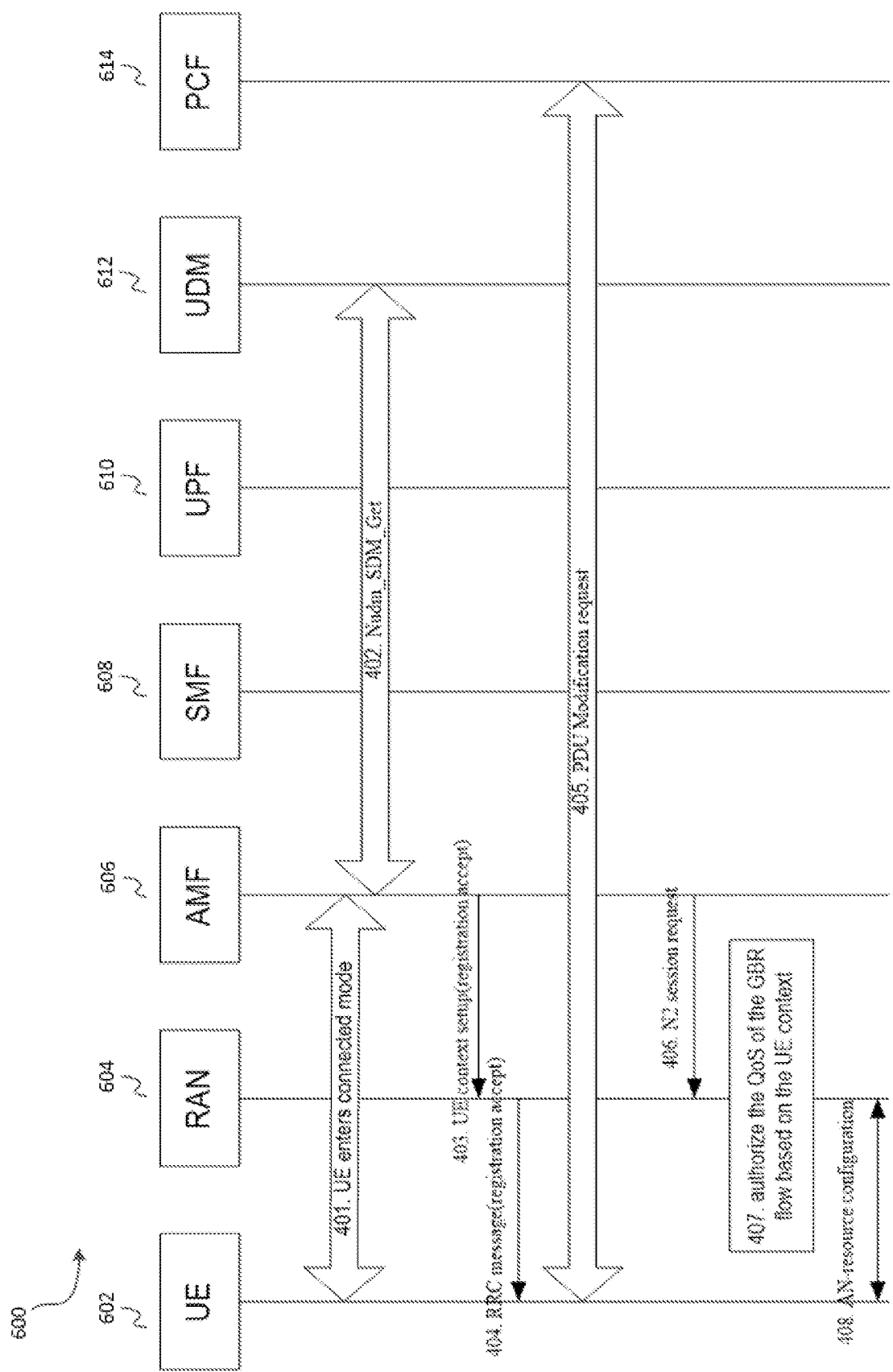
FIG. 6 illustrates a flow diagram of an example environment of a 5G system that stores authorized GFBR in UDM via a PCF, in accordance with some embodiments of the present disclosure.

At operation 605 (labeled in FIG. 6 as, "605. PDU Modification request"), and in some embodiments, the UE 602 may perform a PDU session modification to add a new GBR QoS flow or to modify the QoS (profile) for an existing GBR QoS flow. The SMF 608 can check whether this addition or modification is allowed.

At operation 606 (labeled in FIG. 6 as, "606. N2 session request") and operation 607 (labeled in FIG. 6 as, "607. Authorize the QoS of the GBR flow based on the UE context"), and in some embodiments, when the NG-RAN 604 receives the N2 session request to add a new GBR QoS flow or to modify a QoS profile of an existing GBR QoS flow, the NG-RAN 604 can calculate or determine whether the GFBR/MFBR in use for such slice allows such an operation (e.g., the addition or modification) based on the authorized GFBR/MFBR.

At operation 608 (labeled in FIG. 6 as, "608. AN-resource configuration"), and in some embodiments, if the GFBR/MFBR is allowed, then the NG-RAN 604 performs AN (Access Network) configuration (e.g., a radio resource configuration) as indicated by the SMF 608. If not allowed, the NG-RAN 604 may release other GBR QoS flow in the same slice or reject the request based on an Allocation and Retention Priority (ARP) mechanism. An ARP mechanism indicates a priority level for the allocation and retention of bearers. The mobile network may use an ARP and/or ARP mechanism to decide whether to accept a request to establish a bearer, or reject the request when resources are limited. When performing admission control and network resources are limited, the network may use the ARP to prioritize establishing or modifying bearers with a higher ARP over bearers with a lower ARP.

5.1 From the Perspective of the AMF

In some embodiments, an AMF of a wireless communication node (e.g., BS 102 in FIG. 1) or a wireless communication device (e.g., UE 104 in FIG. 1) receives, from a repository (e.g., UDR) through a Unified Data Management (UDM), an authorized flow bit rate (e.g., authorized GFBR/MFBR) per slice (e.g., for the wireless communication device). In some embodiments, the AMF sends, responsive to a wireless communication device entering a connected mode, the authorized flow bit rate per slice to a Radio Access Network (RAN), to cause the RAN to determine whether to allow the wireless communication device to apply a flow bit rate (e.g., GFBR/MFBR) for a quality of service (QoS) flow.

In some embodiments, applying the flow bit rate (e.g., GFBR/MFBR) for the QoS flow comprises adding or modifying the QoS flow. In some embodiments, the AMF receives, from the wireless communication device through the RAN and prior to receiving the authorized flow bit rate per slice, a service request to transition the wireless communication device from an idle mode to a connected mode. In some embodiments, the message causes the RAN to determine a total flow bit rate (e.g., total GFBR/MFBR) in use per slice for the wireless communication device.

In some embodiments, the RAN determines whether to allow the wireless communication device to apply the flow bit rate for the QoS flow by determining that the flow bit rate for the QoS flow is less than a difference between the total authorized flow bit rate (e.g., total authorized GFBR/MFBR) per slice, and the total flow bit rate (e.g., total GFBR/MFBR) in use per slice. In some embodiments, the AMF receives the authorized flow bit rate per slice by transmitting, by the AMF to the UDM, a request for the authorized flow bit rate per slice. In some embodiments, the AMF receives, from the UDM, a second message indicating that the authorized flow bit rate per slice has changed. In some embodiments, the AMF transmits, to the RAN and responsive to receiving the second message from the UDM, a third message indicating that the authorized flow bit rate per slice has changed.

In some embodiments, the authorized flow bit rate per slice is inaccessible to the AMF prior to receiving the authorized flow bit rate per slice from the repository (e.g., UDR) through the UDM. In some embodiments, the AMF receives the total authorized flow bit rate per slice during a Packet Data Unit (PDU) session establishment procedure. In some embodiments, the QoS flow comprises a guaranteed bit rate (GBR) QoS flow.

5.2 From the Perspective of the RAN

In some embodiments, a radio access network (RAN) of a wireless communication node (e.g., BS 102 in FIG. 1) or a wireless communication device (e.g., UE 104 in FIG. 1) receives, responsive to a wireless communication device entering a connected mode, an indication of an authorized flow bit rate (e.g., authorized GFBR/MFBR) per slice (e.g., for the wireless communication device). In some embodiments, the RAN determines a total flow bit rate (e.g., total GFBR/MFBR) per slice in use. In some embodiments, the RAN determines, according to the indication of the authorized flow bit rate per slice and the total flow bit rate per slice in use, whether to allow the wireless communication device to apply a flow bit rate (e.g., GFBR/MFBR) for a quality of service (QoS) flow.

In some embodiments, applying the flow bit rate for the QoS flow comprises adding or modifying the QoS flow with the flow bit rate. In some embodiments, the RAN transmits, prior to receiving the indication of the authorized flow bit rate per slice, a service request to transition the wireless communication device from an idle mode to a connected mode. In some embodiments, the RAN determines whether to allow the wireless communication device to apply the flow bit rate for the QoS flow by determining that the flow bit rate for the QoS flow is less than a difference between the total authorized flow bit rate per slice, and the total flow bit rate in use per slice.

In some embodiments, the RAN receives, from the AMF, a message indicating that the authorized flow bit rate per slice has changed. In some embodiments, the authorized flow bit rate per slice is inaccessible to the AMF prior to receiving the indication of the authorized flow bit rate per slice from the AMF. In some embodiments, the RAN determines the total authorized flow bit rate per slice during or after a Packet Data Unit (PDU) session establishment procedure.

FIG. 7 is a flow diagram depicting a method for provide quality of service (QoS) control for a specific user equipment (UE) in a slice, in accordance with some embodiments of the present disclosure. Additional, fewer, or different operations may be performed in the method depending on the particular embodiment. In some embodiments, some or all operations of method 700 may be performed by a wireless communication node, such as BS 102 in FIG. 1. In some operations, some or all operations of method 700 may be performed by a wireless communication device, such as UE 104 in FIG. 1. Each operation may be re-ordered, added, removed, or repeated.

As shown, the method 700 includes the operation 702 of receiving, by a Session Management Function (SMF) from an Access and Mobility Management Function (AMF), a request for a quality of service (QoS) flow for a wireless communication device, in some embodiments. The method includes the operation 704 of determining, by the SMF responsive to receiving the request, a flow bit rate for the QoS flow, in some embodiments. The method includes the operation 706 of transmitting, by the SMF to a repository through a Unified Data Management (UDM), a message causing the UDM to update a total flow bit rate in use according to the flow bit rate, in some embodiments.

FIG. 8 is a flow diagram depicting a method for provide quality of service (QoS) control for a specific user equipment (UE) in a slice, in accordance with some embodiments of the present disclosure. Additional, fewer, or different operations may be performed in the method depending on the particular embodiment. In some embodiments, some or all operations of method 800 may be performed by a wireless communication node, such as BS 102 in FIG. 1. In some operations, some or all operations of method 800 may be performed by a wireless communication device, such as UE 104 in FIG. 1. Each operation may be re-ordered, added, removed, or repeated.

As shown, the method 800 includes the operation 802 of receiving, by a Session Management Function (SMF) from an Access and Mobility Management Function (AMF), a request for a quality of service (QoS) flow for a wireless communication device, in some embodiments. The method includes the operation 804 of determining, by the SMF responsive to receiving the request, a flow bit rate for the QoS flow, in some embodiments. The method includes the operation 806 of transmitting, by the SMF to a Policy Control Function (PCF), an indication of the flow bit rate for the QoS flow, in some embodiments.

FIG. 9 is a flow diagram depicting a method for provide quality of service (QoS) control for a specific user equipment (UE) in a slice, in accordance with some embodiments of the present disclosure. Additional, fewer, or different operations may be performed in the method depending on the particular embodiment. In some embodiments, some or all operations of method 900 may be performed by a wireless communication node, such as BS 102 in FIG. 1. In some operations, some or all operations of method 900 may be performed by a wireless communication device, such as UE 104 in FIG. 1. Each operation may be re-ordered, added, removed, or repeated.

As shown, the method 900 includes the operation 902 of receiving, by an Access and Mobility Management Function (AMF) from a repository through a Unified Data Management (UDM), an authorized flow bit rate per slice, in some embodiments. The method includes operation 904 of sending, by the AMF responsive to a wireless communication device entering a connected mode, the authorized flow bit rate per slice to a Radio Access Network (RAN), to cause the RAN to determine whether to allow the wireless communication device to apply a flow bit rate for a quality of service (QoS) flow, in some embodiments.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein.

Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   receiving, by a Session Management Function (SMF) from an Access and Mobility Management Function (AMF), a request for a quality of service (QoS) flow for a wireless communication device;
   determining, by the SMF responsive to receiving the request, a flow bit rate for the QoS flow; and
   transmitting, by the SMF to a repository through a Unified Data Management (UDM), a message causing the UDM to update a total flow bit rate in use according to the flow bit rate.

2. The method of claim 1, wherein the request for the QoS flow comprises a request to add, modify, or delete the QoS flow.

3. The method of claim 1, comprising:
   receiving, by the SMF from the AMF and prior to receiving the request, a service request to transition the wireless communication device from an idle mode to a connected mode.

4. The method of claim 1, wherein determining the flow bit rate comprises determining the flow bit rate for the QoS flow according to an authorization policy.

5. The method of claim 4, comprising:
receiving, by the SMF from the UDM, a total authorized flow bit rate per slice, and a total flow bit rate in use per slice.

6. The method of claim 5, comprising:
authorizing, by the SMF, the flow bit rate for the QoS flow according to the total authorized flow bit rate per slice, and a total flow bit rate in use per slice.

7. The method of claim 6, comprising:
determining, by the SMF, that the flow bit rate for the QoS flow is less than a difference between the total authorized flow bit rate per slice, and the total flow bit rate in use per slice.

8. The method of claim 5, wherein the SMF receives the total authorized flow bit rate per slice, and the total flow bit rate in use per slice during a Packet Data Unit (PDU) session establishment procedure.

9. The method of claim 1, wherein the QoS flow comprises a guaranteed bit rate (GBR) QoS flow.

10. The method of claim 1, wherein the message includes an updated total flow bit rate in use per slice, or the flow bit rate for the QoS flow.

11. The method of claim 1, comprising:
transmitting, by the SMF to the AMF, a second message comprising an N1 container, the second message causing the AMF to transmit the N1 container to the wireless communication device through the RAN.

12. The method of claim 1, comprising:
transmitting, by the SMF to the RAN through the AMF, a second message comprising an N2 container, the second message causing the RAN to configure a radio resource according to the N2 container.

13. A method, comprising:
transmitting, by an Access and Mobility Management Function (AMF) to a Session Management Function (SMF), a request for a quality of service (QoS) flow for a wireless communication device;
wherein the request causes the SMF to perform steps of:
determining a flow bit rate for the QoS flow, and
transmitting, to a repository through a Unified Data Management (UDM), a message causing the UDM to update a total flow bit rate in use according to the flow bit rate.

14. The method of claim 13, wherein the request for the QoS flow comprises a request to add, modify, or delete the QoS flow.

15. The method of claim 13, comprising:
transmitting, by the AMF to the SMF and prior to transmitting the request, a service request to transition the wireless communication device from an idle mode to a connected mode.

16. The method of claim 13, wherein the QoS flow comprises a guaranteed bit rate (GBR) QoS flow.

17. The method of claim 13, comprising:
receiving, by the AMF from the SMF, a second message comprising an N1 container; and
transmitting, by the AMF, the N1 container to the wireless communication device through a radio access network (RAN).

18. The method of claim 13, comprising:
receiving, by the AMF from the SMF, a second message comprising an N2 container; and
transmitting, by the AMF to a radio access network (RAN), a third message causing the RAN to configure a radio resource according to the N2 container.

19. A Session Management Function (SMF), comprising:
at least one processor configured to:
receive, via a receiver from an Access and Mobility Management Function (AMF), a request for a quality of service (QoS) flow for a wireless communication device;
determine, responsive to receiving the request, a flow bit rate for the QoS flow; and
transmit, via a transmitter to a repository through a Unified Data Management (UDM), a message causing the UDM to update a total flow bit rate in use according to the flow bit rate.

20. A system, comprising:
an Access and Mobility Management Function (AMF) comprising at least one processor configured to:
transmit, via a transmitter to a Session Management Function (SMF), a request for a quality of service (QoS) flow for a wireless communication device,
wherein the request causes the SMF to determine a flow bit rate for the QoS flow, and transmit, to a repository through a Unified Data Management (UDM), a message causing the UDM to update a total flow bit rate in use according to the flow bit rate.

* * * * *